(12) United States Patent
Kitamura et al.

(10) Patent No.: US 8,319,376 B2
(45) Date of Patent: Nov. 27, 2012

(54) CONTACTLESS POWER TRANSMISSION CIRCUIT

(75) Inventors: Hiroyasu Kitamura, Hirakata (JP); Kyohei Kada, Hikone (JP)

(73) Assignee: Panasonic Corporation, Osaka (JP)

( * ) Notice: Subject to any disclaimer, the term of this patent is extended or adjusted under 35 U.S.C. 154(b) by 224 days.

(21) Appl. No.: 12/633,008

(22) Filed: Dec. 8, 2009

(65) Prior Publication Data

US 2010/0171367 A1 Jul. 8, 2010

(30) Foreign Application Priority Data

Jan. 8, 2009 (JP) .................................. 2009-002823

(51) Int. Cl.
*H01F 27/42* (2006.01)

(52) U.S. Cl. ............ 307/104; 307/140; 363/16; 363/17; 363/20; 363/25; 363/98; 320/108

(58) Field of Classification Search .................. 307/104, 307/140; 320/108; 363/20
See application file for complete search history.

(56) References Cited

U.S. PATENT DOCUMENTS

| 5,488,552 | A | * | 1/1996 | Sakamoto et al. ............... 363/97 |
| 5,706,183 | A | * | 1/1998 | Abe et al. ......................... 363/18 |
| 5,896,278 | A | | 4/1999 | Tamura et al. |
| 6,016,259 | A | * | 1/2000 | Tamura et al. .............. 363/21.02 |
| 6,040,986 | A | * | 3/2000 | Sakamoto et al. ......... 363/21.02 |
| 7,242,594 | B2 | * | 7/2007 | Chan et al. ....................... 363/17 |
| 7,310,245 | B2 | * | 12/2007 | Ohbo .......................... 363/21.02 |
| 7,394,670 | B2 | | 7/2008 | Koike |
| 7,782,633 | B2 | * | 8/2010 | Yamauchi et al. ......... 363/21.02 |
| 7,923,870 | B2 | * | 4/2011 | Jin ................................. 307/140 |
| 8,179,088 | B2 | * | 5/2012 | Takaishi et al. ................ 320/107 |
| 8,258,652 | B2 | * | 9/2012 | Sekino et al. .................. 307/104 |
| 2008/0231120 | A1 | | 9/2008 | Jin |
| 2009/0001818 | A1 | * | 1/2009 | Iisaka et al. .................... 307/104 |

FOREIGN PATENT DOCUMENTS

| EP | 0853372 | | 7/1998 |
| EP | 0923182 | | 6/1999 |
| JP | 2000-166129 | | 6/2000 |
| JP | 3363341 | | 1/2003 |
| JP | 3416863 | | 6/2003 |
| JP | 2005-278263 | | 10/2005 |
| JP | 2006-60909 | | 3/2006 |
| JP | 2008054435 | A * | 3/2008 |
| JP | 2008-236916 | | 10/2008 |
| WO | 2004/057744 | | 7/2004 |
| WO | 2008/023679 | | 2/2008 |

OTHER PUBLICATIONS

Japanese Office action, dated Apr. 26, 2011, from Japan Patent Office (JPO), (together with an English language Abstract of the Japanese Office Action).

* cited by examiner

*Primary Examiner* — Jared Fureman
*Assistant Examiner* — Alfonso Perez Borroto
(74) *Attorney, Agent, or Firm* — Greenblum & Bernstein, P.L.C.

(57) ABSTRACT

A driving circuit drives a switching element such that an ON-period of the switching element is shorter when a power receiving device is detected not to be placed than when the power receiving device is placed.

5 Claims, 6 Drawing Sheets

CONTACTLESS POWER TRANSMISSION CIRCUIT

BACKGROUND OF THE INVENTION AND RELATED ART STATEMENT

1. Field of the Invention

The present invention relates to a contactless power transmission circuit for transmitting power in a contactless manner to a power receiving device placed on a placing portion.

2. Description of the Related Art

In recent years, there has been known a contactless power transmission circuit provided with a resonant circuit including a power transmission coil for transmitting power to a power receiving device and a resonance coil which resonates with this power transmission coil, a switching elements for resonating this resonant circuit and a driving circuit for driving this switching element, and adapted to transmit power in a contactless manner to the power receiving device placed on a placing portion and charge the power receiving device (see, for example, patent literature 1 (Publication of JP No. 3416863), patent literature 2 (Publication of JP No. 3363341)).

In such a contactless power transmission circuit, the inductance of the power transmission coil is smaller when the power receiving device is not placed on the placing portion than when it is placed. Thus, a current flowing into the power transmission coil increases, resulting in a problem of increasing standby power.

However, patent literature 1 aims to stably oscillate the resonant circuit and patent literature 2 aims to miniaturize the circuit. Neither of the literatures aims to reduce the standby power.

Accordingly, patent literature 3 (JP-A No. 2008-236916) discloses a contactless power transmission circuit provided with a power transmitting device including a primary coil and a power receiving device including a secondary coil, wherein a change in the self-inductance of the primary coil is detected immediately after a power feeder starts feeding power to the primary coil, and the power feeding of the power feeder is stopped if a detected value of this change is below a specified value while being continued if the detected value is equal to or above the specified value.

Further, patent literature 4 (JP-A No. 2000-166129) discloses technology enabling a reduction of standby power by detecting an input current input to an electromagnetic transformer from a commercial power supply via a rectifying circuit and causing a switching element to intermittently operate by a controller when this input current is equal to or below a set value to suppress power consumption of a charger during non-charging periods.

However, a series resonant circuit is built by the primary coil and a capacitor in patent literature 3. Since this series resonant circuit is not resonated by turning the switching element on and off, the principle of oscillation is totally different from the invention of this application.

Further, in patent literature 4, the switching element is connected to a primary side power feeding coil. Since this switching element does not oscillate the primary side power feeding coil, the principle of oscillation is totally different from the invention of this application. Further, in patent literature 4, charging and non-charging are detected by detecting the input current input to the electromagnetic transformer from the commercial power supply via the rectifying circuit. Since the input current is unstable by being influenced by the commercial power supply, there is a problem of being unable to accurately detect charging and non-charging.

SUMMARY OF THE INVENTION

An object of the present invention is to provide a contactless power transmission circuit capable of reducing standby power.

One aspect of the present invention is directed to a contactless power transmission circuit for transmitting power in a contactless state to a power receiving device placed on a placing portion, comprising a resonant circuit including a power transmission coil for transmitting power to the power receiving device and a resonant capacitor which resonates with the power transmission coil; a switching element for resonating the resonant circuit by being repeatedly turned on and off; and a driving circuit for detecting whether or not the power receiving device is placed on the placing portion based on a voltage of the power transmission coil and driving the switching element such that an ON-period of the switching element is shorter when the power receiving device is detected not to be placed than when the power receiving device is placed.

DETAILED DESCRIPTION OF THE PREFERRED EMBODIMENTS OF THE INVENTION

The invention is now described, by way of examples, with reference to the accompanying drawings.

First Embodiment

Figure 1:
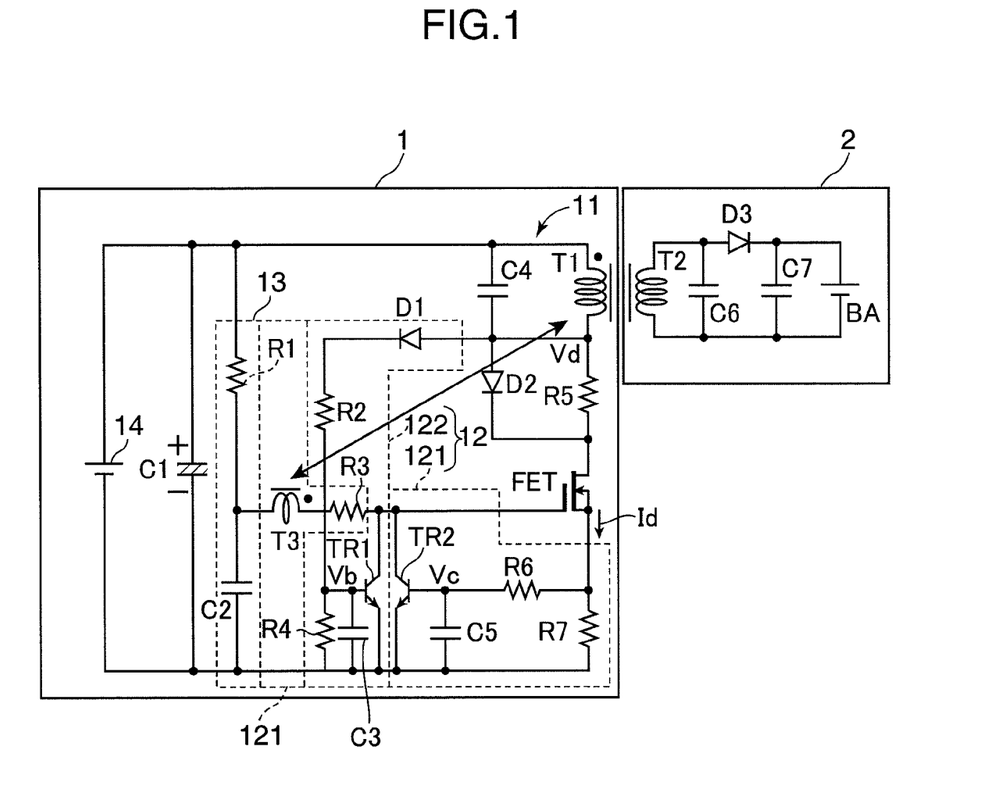
FIG. 1 is a circuit diagram of a charging system, to which a contactless power transmission circuit according to a first embodiment of the present invention is applied.

FIG. 1 is a circuit diagram of a charging system, to which a contactless power transmission circuit according to a first embodiment of the present invention is applied. This charging system is provided with a contactless power transmission circuit 1 and a power receiving device 2. The contactless power transmission circuit 1 is a charging circuit including a placing portion (not shown), on which the power receiving device 2 is to be placed, in a housing and adapted to charge the power receiving device 2 by transmitting power in a contactless manner to the power receiving device 2 placed on this placing portion. A rechargeable electric device such as an electric toothbrush, a mobile phone, a notebook personal computer, an electric shaver or an electric tool can be, for example, adopted as the power receiving device 2.

The contactless power transmission circuit 1 includes a resonant circuit 11, a switching element FET, a driving circuit 12, a bias circuit 13, a capacitor C1 and a power supply 14.

The resonant circuit 11 includes a power transmission coil T1 for transmitting power to the power receiving device 2 and a resonant capacitor C4 which resonates with the power transmission coil T1. The power transmission coil T1 and the resonant capacitor C4 are connected in parallel. The power transmission coil T1 is magnetically coupled to a power receiving coil T2 and transmits power to the power receiving device 2 via the power receiving coil T2 when the power receiving device 2 is placed on the placing portion.

Here, the power transmission coil T1 starts resonating with the resonant capacitor C4 and transmits a resonance voltage, whose phase is shifted by 180°, to a magnetically coupled feedback coil T3 when the switching element FET is turned off, whereby the switching element FET is turned on again.

The resonant circuit 11 is connected to the switching element FET via a diode D2 and a resistor R5 connected in parallel. The diode D2 has an anode thereof connected to the resonant capacitor C4 and the power transmission coil T1 and a cathode thereof connected to a drain of the switching element FET.

The switching element FET resonates the resonant circuit 11 by being repeatedly turned on and off. For example, an n-channel field-effect transistor is adopted as the switching element FET. A gate of the switching element FET as a control terminal is connected to the feedback coil T3 via a resistor R3.

The drain of the switching element FET is connected to the power transmission coil T1 via the resistor R5 and to the resonant capacitor C4 via the diode D2. Further, a source of the switching element FET is grounded via a resistor R7. A p-channel field-effect transistor may also, for example, be adopted as the switching element FET.

The driving circuit 12 detects whether or not the power receiving device 2 is placed on the placing portion based on a voltage of the power transmission coil T1 and drives the switching element FET such that an ON-period of the switching element FET is shorter when the power receiving device 2 is detected not to be placed than when the power receiving device 2 is placed.

Here, the driving circuit 12 includes a self-oscillating circuit 121 and an intermittent driving circuit 122. The self-oscillating circuit 121 repeatedly turns the switching element FET on and off based on the voltage of the power transmission coil T1 to cause the self-oscillation of the resonant circuit 11. The intermittent driving circuit 122 intermittently drives the self-oscillating circuit 121 when the power receiving device 2 is detected not to be placed.

The self-oscillating circuit 121 includes a transistor TR2, a capacitor C5, resistors R6, R7, the feedback coil T3 and the resistor R3.

The transistor TR2 is, for example, an npn bipolar transistor, and an emitter thereof is grounded and a collector thereof is connected to the gate of the switching element FET. Further, the transistor TR2 has the capacitor C5 connected in parallel between a base and the emitter thereof and has the base thereof connected to the resistor R7 via the resistor R6. The transistor TR2 is not limited to the npn bipolar transistor and a pnp bipolar transistor or a field-effect transistor may also be adopted.

The capacitor C5 is charged with a drain current Id of the switching element FET and turns the transistor TR2 on when the charging voltage exceeds a threshold voltage (e.g. 0.6 V) of the transistor TR2. Thus, a gate voltage of the switching element FET is reduced to a ground level and the transistor TR2 turns the switching element FET off.

On the other hand, the capacitor C5 discharges electric charges to the resistors R6, R7 when the transistor TR2 is turned on, and turns the transistor TR2 off when the charging voltage falls below the threshold voltage of the transistor TR2. In other words, the capacitor C5 turns the transistor TR2 on and off based on a time constant determined by the capacitor C5 and the resistors R6, R7.

The feedback coil T3 is so magnetically coupled to the power transmission coil T1 as to have an opposite polarity and turns the switching element FET on by outputting a resonance voltage transmitted from the power transmission coil T1 to the gate of the switching element FET via the resistor R3.

The bias circuit 13 includes a resistor R1 and a capacitor C2, generates a bias voltage of the switching element FET based on a voltage output from the capacitor C1 and outputs the generated bias voltage to the gate of the switching element FET via the feedback coil T3 and the resistor R3.

The power supply 14 is, for example, a power supply circuit and converts a commercial voltage of, e.g. 100 V into a direct-current voltage of 5V. The capacitor C1 is, for example, an electrolytic capacitor and smoothes the voltage output from the power supply 14.

The intermittent driving circuit 122 includes a transistor TR1 (first transistor) connected to the gate of the switching element FET and adapted to turn the switching element FET off, resistors R2, R4 (voltage dividing resistor) for dividing the voltage of the resonant circuit 11 and outputting the divided voltage to a base of the transistor TR1 as a control terminal, a diode D1 connected between the resonant circuit 11 and the resistor R2, and a capacitor C3 (first capacitor) connected to the base of the transistor TR1 and charged with a voltage Vb divided by the resistors R2, R4.

The transistor TR1 is, for example, an npn bipolar transistor. The base of the transistor TR1 is connected to the power transmission coil T1 via the resistor R2 and the diode D1. The inflow of the current from the intermittent driving circuit 122 to the resonant circuit 11 is prevented by the diode D1, thereby preventing resonance by the resonant circuit 11 from becoming unstable.

The transistor TR1 has the resistor R4 connected between the base and emitter thereof and the emitter thereof is grounded. The transistor TR1 is not limited to the npn bipolar transistor and a pnp bipolar transistor or a field-effect transistor may also be adopted.

The capacitor C3 is connected between the base and emitter of the transistor TR1 and charged with the voltage Vb and turns the transistor TR1 on when the charging voltage exceeds the threshold voltage (e.g. 0.6V) of the transistor TR1. Thus, the switching element FET is turned off and the self-oscillating circuit 121 can no longer feed the drain current Id to the capacitor C5 and stops self-oscillation.

On the other hand, the capacitor C3 discharges electric charges to the resistor R4 when turning the transistor TR1 on and turning the switching element FET off, and turns the transistor TR1 off when the charging voltage falls below the threshold voltage of the transistor TR1.

In other words, the transistor TR1 is repeatedly turned on and off based on a time constant determined by the resistor R4 and the capacitor C3. This time constant is considerably larger than the time constant of the capacitor C5 and the resistors R6, R7 for turning the transistor TR2 on and off.

Figure 2A:
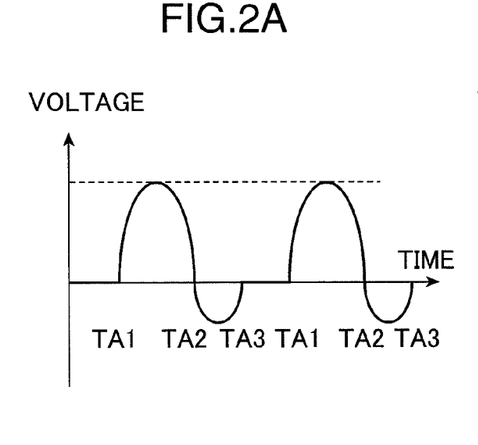
FIG. 2A is a waveform chart of a voltage at a connection point of a power transmission coil and a resonant capacitor when a power receiving device is placed on a placing portion and FIG. 2B is a waveform chart of a voltage at the connection point of the power transmission coil and the resonant capacitor when the power receiving device is not placed on the placing portion.
Figure 2B:
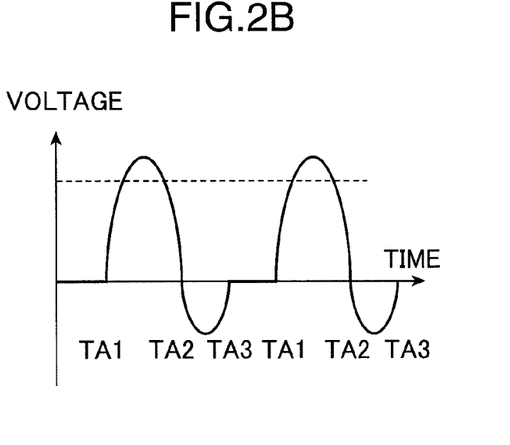
Figure 3A:
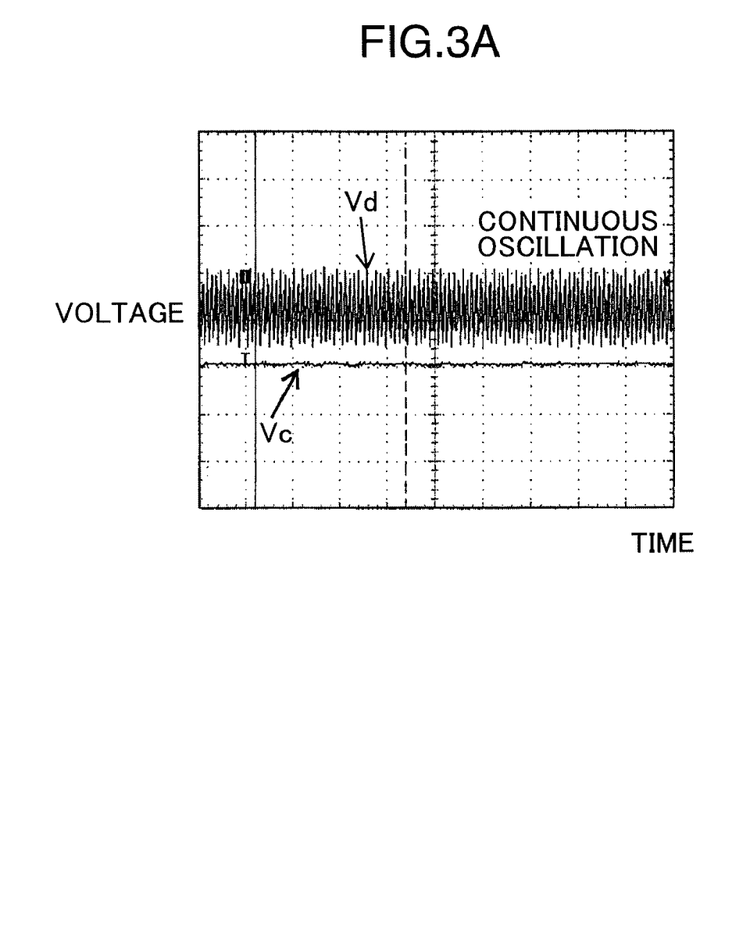
FIG. 3A is a waveform chart of a voltage at the connection point of the power transmission coil and the resonant capacitor when the power receiving device is placed on the placing portion and FIG. 3B is a waveform chart of a voltage at the connection point of the power transmission coil and the resonant capacitor when the power receiving device is not placed on the placing portion.
Figure 3B:
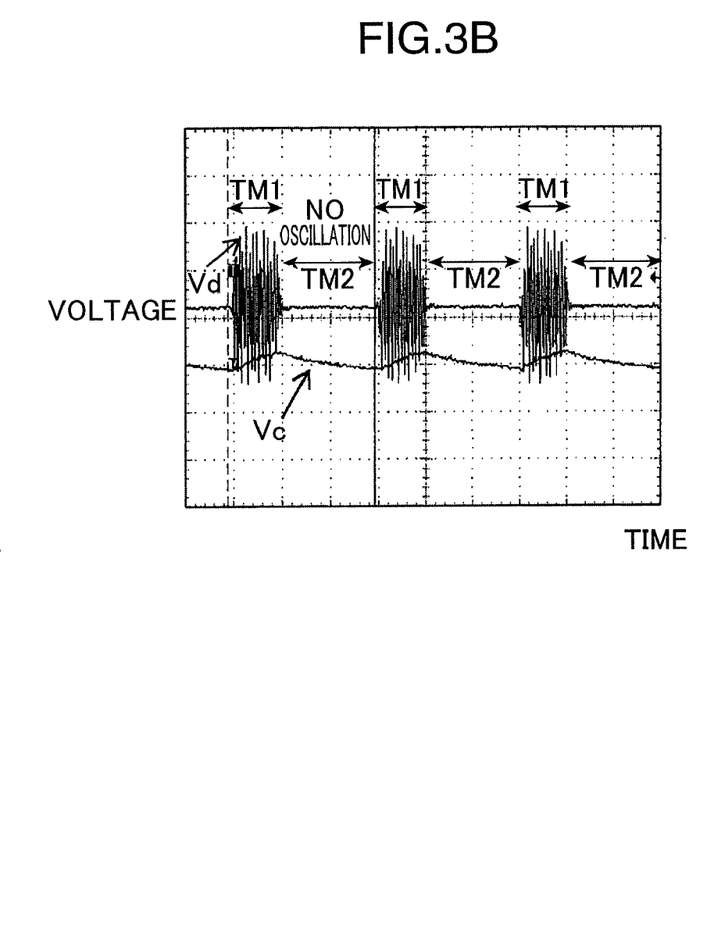

FIGS. 2A and 3A are waveform charts of the voltage Vd when the power receiving device 2 is placed on the placing portion, and FIG. 2B and 3B are waveform charts of the voltage Vd when the power receiving device 2 is not placed on the placing portion. In FIGS. 2A and 2B, a vertical axis represents voltage and a horizontal axis represents time. FIGS. 2A and 2B show enlarged waveforms of FIGS. 3A, 3B. In other words, the waveforms of FIGS. 2A and 2B are those enlargedly showing waveforms of two cycles of FIGS. 3A and 3B. In FIGS. 3A, 3B, an upper waveform indicates the voltage Vd and a lower waveform indicates the voltage Vc between the base and emitter of the transistor TR2.

As shown in FIG. 2B, it can be understood that the amplitude of the voltage of the power transmission coil T1 is larger and the amplitude of the voltage Vd is larger when the power receiving device 2 is not placed on the placing portion than when the power receiving device 2 is placed as shown in FIG. 2A. This is because the self-inductance of the power transmission coil T1 is smaller when the power receiving device 2 is not placed on the placing portion than when the power receiving device 2 is placed.

Thus, when the power receiving device 2 is not placed on the placing portion, the voltage Vb also increases and can exceed the threshold voltage of the transistor TR1 and the transistor TR1 can be repeatedly turned on and off based on the time constant determined by the resistor R4 and the capacitor C3. As a result, the self-oscillating circuit 121 can cause the self-oscillation of the resonant circuit 11 as shown by periods TM1 of FIG. 3B for a period during which the intermittent driving circuit 122 keeps the switching element FET on, but cannot cause the self-oscillation of the resonant circuit 11 as shown by periods TM2 of FIG. 3B for a period during which the intermittent driving circuit 122 keeps the switching element FET off.

On the other hand, the voltage Vb is lower when the power receiving device 2 is placed on the placing portion than when the power receiving device 2 is not placed. Thus, the voltage Vb can no longer exceed the threshold voltage of the transistor TR1 and the transistor TR1 can no longer turn the switching element FET off. Thus, the self-oscillating circuit 121 can cause the self-oscillation of the resonant circuit 11 without being influenced by the intermittent driving circuit 122 as shown in FIG. 3A.

Circuit constants of respective circuit elements constituting the intermittent driving circuit 122 are set to such values that the voltage Vb cannot exceed the threshold voltage of the transistor TR1 when the power receiving device 2 is placed on the placing portion and can exceed the threshold value of the transistor TR1 when the power receiving device 2 is not placed on the placing portion.

Referring back to FIG. 1, the power receiving device 2 includes the power receiving coil T2, a diode D3, capacitors C6, C7 and a secondary battery BA. The power receiving coil T2 is magnetically coupled to the power transmission coil T1 and receives power transmitted from the power transmission coil T1. The capacitor C6 is a rectifying capacitor provided to receive more power. The capacitor C7 smoothes a voltage generated in the power receiving coil T2. The diode D3 rectifies the voltage generated in the power receiving coil T2. Thus, a direct-current voltage is applied to the secondary battery BA, which is charged with this direct-current voltage. For example, one of various secondary batteries such as a lithium ion secondary battery, a nickel hydrogen secondary battery and a lead storage battery can be adopted as the secondary battery BA.

Next, the operation of the contactless power transmission circuit 1 shown in FIG. 1 is described. When the input of the direct-current voltage is started by the power supply 14, this direct-current voltage charges the gate capacitance of the switching element FET via the resistor R1, the feedback coil T3 and the resistor R3, thereby turning the switching element FET on.

When the switching element FET is turned on, a current flows from the resonant capacitor C4 to the diode D2 to the switching element FET and to the resistor R7 and a current also flows between the power transmission coil T1, the diode D2, the switching element FET and the resistor R7, whereby the drain current Id flows.

When the drain current Id flows, the voltage of the resistor R7 increases to charge the capacitor C5 via the resistor R6, whereby the transistor TR2 is turned on.

When the transistor TR2 is turned on, the switching element FET is turned off and the current having flowed into the power transmission coil T1 flows into the resonant capacitor C4, whereby resonance is started in the resonant circuit 11.

When the resonance is started in the resonant circuit 11, the voltage Vb changes along a downwardly convex curve as shown at time TA2 of FIGS. 2A, 2B after changing along an upwardly convex curve as shown at time TA1. Here, since a voltage, whose phase is shifted by 180° from the voltage Vd, is applied to the feedback coil T3, the switching element FET is kept off during a period between time TA1 and time TA2. When the resonance is started in the resonant circuit 11, the capacitor C5 starts discharging electric charges to the resistors R6, R7 since the charging with the drain current Id is stopped.

During a period from time TA2 to time TA3, a positive voltage is generated in the feedback coil T3, whereby the switching element FET is turned on again. In the above way, the self-oscillating circuit 121 repeatedly turns the switching element FET on and off to resonate the resonant circuit 11 and transmit power to the power receiving device 2.

Since the amplitude of the voltage Vd is higher when the power receiving device 2 is not placed on the placing portion than when it is placed as shown in FIG. 2B, the intermittent driving circuit 122 can turn the transistor TR1 on to turn the switching element FET off.

When the switching element FET is turned off, the resonance of the resonant circuit 11 eventually stops and the self-oscillating circuit 121 can no longer resonate the resonant circuit 11 as shown by the periods TM2 of FIG. 3B.

When the switching element FET is turned off, the capacitor C3 starts discharging to the resistor R4 and, eventually, turns the transistor TR1 off to turn the switching element FET on again, and the self-oscillating circuit 121 resonates the resonant circuit 11 again as shown by the periods TM1 of FIG. 3B. Accordingly, the periods TM2 shown in FIG. 3B can be determined by the time constant determined by the capacitor C3 and the resistor R4 and the oscillation of the resonant circuit 11 can be stopped during the periods TM2.

As described above, according to the contactless power transmission circuit 1 of this embodiment, the power transmission coil T1 resonates with the resonant capacitor C4 to transmit power to the power receiving device 2 in a contactless manner as the switching element FET is turned on and off. Here, when the power receiving device 2 is not placed, the intermittent driving circuit 122 intermittently drives the self-oscillating circuit 121. Accordingly, the switching element FET is kept off for a period during which the self-oscillating circuit 121 is not driven, whereby the current flowing into the power transmission coil T1 decreases and the input current from the power supply 14 decreases to reduce standby power.

Further, since a detection as to whether or not the power receiving device 2 is placed is made based on the voltage of the power transmission coil T1, this detection can be made by a simple circuit construction even without providing a separate coil. Furthermore, since the voltage of the power transmission coil T1 notably differs between when the power receiving device 2 is placed and when the power receiving device 2 is not placed, the detection as to whether or not the power receiving device 2 is placed can be accurately made.

Second Embodiment

Figure 4:
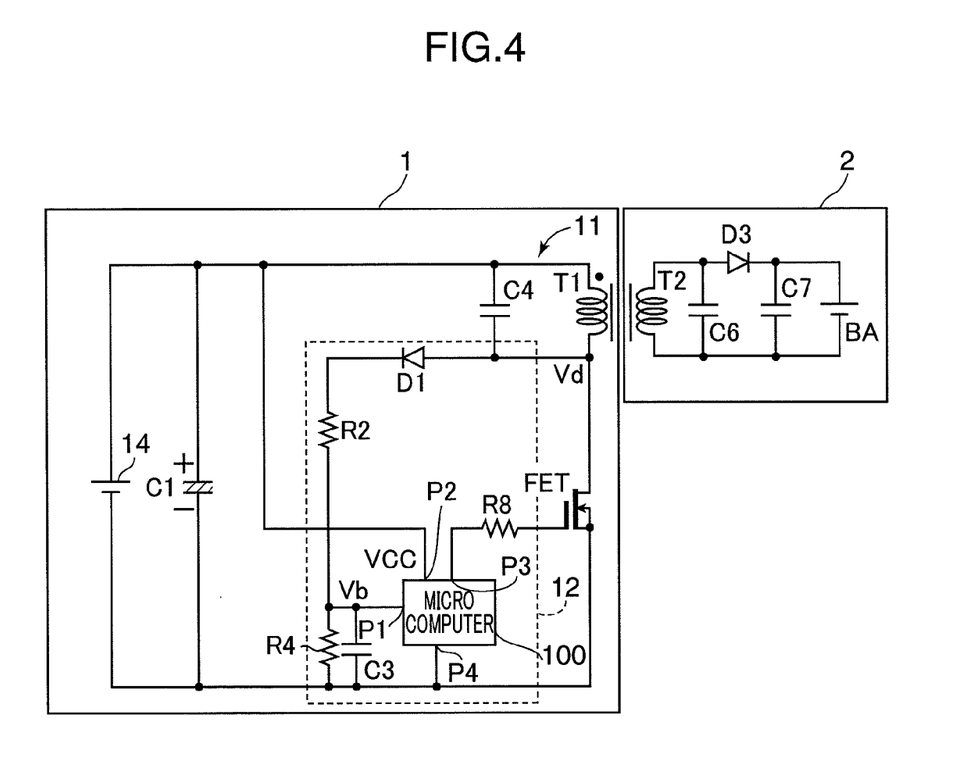
FIG. 4 is a circuit diagram of a charging system, to which a contactless power transmission circuit according to a second embodiment of the present invention is applied.

FIG. 4 is a circuit diagram of a charging system, to which a contactless power transmission circuit according to a second embodiment of the present invention is applied. The contactless power transmission circuit according to this embodiment is characterized by causing the separately-excited oscillation of a resonant circuit 11. In this embodiment, the same elements as those of the first embodiment are not described.

As shown in FIG. 4, a driving circuit 12 includes a microcomputer 100, a diode D1, resistors R2, R4 and a capacitor C3.

The microcomputer 100 includes a CPU, a ROM, a RAM, a dedicated hardware circuit and the like and outputs a PWM signal to a gate of a switching element FET from a PWM output port P3 to turn the switching element FET on and off by executing a control program stored in the ROM. A drive voltage VCC of 5 V output from a power supply 14 is input to a VCC port P2.

Here, the microcomputer 100 has the capacitor C3 connected between an AD input port P1 and a ground port P4, A/D (analog-to-digital) converts a voltage Vd input to the AD input port P1 and detects that a power receiving device 2 is not placed on a placing portion if the value of the A/D converted voltage Vb is larger than a predetermined specified value. The microcomputer 100 sets a smaller duty ratio of the PWM signal when the power receiving device 2 is detected not to be placed than when the power receiving device is placed, thereby shortening an ON-period of the switching element FET. Here, the value of the voltage Vb assumed to be input to the AD input port P1 when the power receiving device 2 is placed may be adopted as the specified value.

On the other hand, the microcomputer 100 detects that the power receiving device 2 is placed on the placing portion when the voltage Vb is equal to or below the specified value, and sets a larger duty ratio of the PWM signal than when the power receiving device 2 is not placed.

Figure 5A:
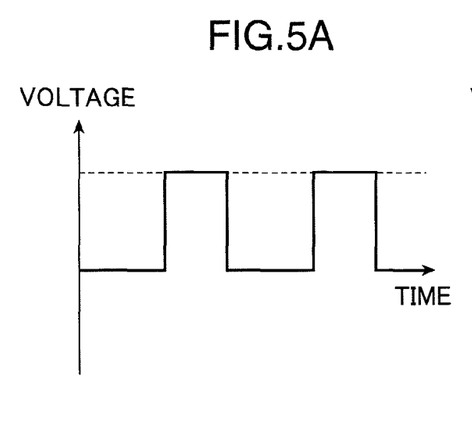
FIG. 5A is a chart showing a PWM signal output from a microcomputer when the power receiving device is placed and FIG. 5B is a chart showing a PWM signal output from the microcomputer when the power receiving device is not placed.
Figure 5B:
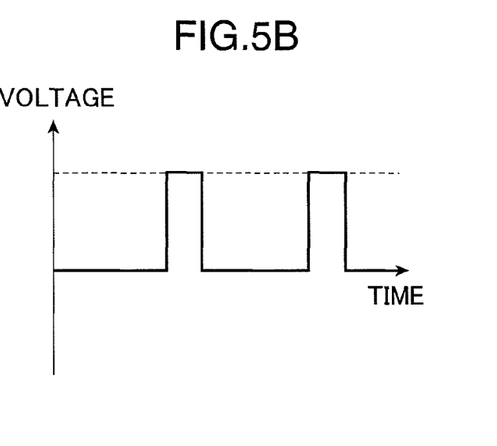

FIG. 5A shows a PWM signal output from the microcomputer 100 when the power receiving device 2 is placed, and FIG. 5B shows a PWM signal output from the microcomputer 100 when the power receiving device 2 is not placed. As shown in FIGS. 5A and 5B, the microcomputer 100 is understood to output the PWM signal having a smaller duty ratio when the power receiving device 2 is not placed than when the power receiving device 2 is placed.

Here, a value predetermined to enable preferable power to be obtained in charging the power receiving device 2 can be adopted as the duty ratio of the PWM signal when the power receiving device 2 is placed. Further, a predetermined value capable of detecting whether or not the power receiving device 2 is placed and maximally increasing an OFF-period of the switching element FET can be adopted as the duty ratio of the PWM signal when the power receiving device 2 is not placed.

The resistors R2, R4 are voltage dividing resistors for dividing the voltage Vb similar to the first embodiment, and the divided voltage Vb is input to the AD input port P1. A resistor R8 is connected between the PWM output port P3 and a gate of the switching element FET.

Next, the operation of the contactless power transmission circuit 1 shown in FIG. 4 is described. Since the voltage Vb is higher than the specified value when the power receiving device 2 is not placed on the placing portion, the microcomputer 100 detects that the power receiving device 2 is not placed and outputs a PWM signal having a lower duty ratio shown in FIG. 5B. By this PWM signal, the switching element FET is turned on and off and the resonant circuit 11 accumulates energy during the ON-period of the switching element FET and resonates with the accumulated energy during the OFF-period of the switching element FET to transmit power to the power receiving device 2. Thus, the ON-period of the switching element FET becomes shorter when the power receiving device 2 is not placed on the placing portion than when it is placed, wherefore standby power can be reduced.

On the other hand, since the voltage Vb is equal to or below the specified value when the power receiving device 2 is placed on the placing portion, the microcomputer 100 detects that the power receiving device 2 is placed on the placing portion and outputs a PWM signal having a higher duty ratio shown in FIG. 5A. Thus, the ON-period of the switching element FET becomes longer when the power receiving device 2 is placed on the placing portion than when it is not placed, wherefore power sufficient in charging the power receiving device 2 can be transmitted to the power receiving device 2.

In the above description, the standby power is reduced by reducing the duty ratio of the PWM signal when the power receiving device 2 is not placed on the placing portion. However, the output of the PWM signal may be stopped when the power receiving device 2 is not placed on the placing portion. Thus, the standby power can be further reduced.

However, when the output of the PWM signal is completely stopped, the resonant circuit 11 no longer resonates and the microcomputer 100 can no longer detect whether or not the power receiving device 2 is placed.

Accordingly, the microcomputer 100 may detect whether or not the power receiving device 2 is placed by intermittently outputting the PWM signal. Here, the microcomputer 100 may intermittently output the PWM signal, for example, by outputting the PWM signal for only 0.2 sec per 1 sec.

As described above, according to the contactless power transmission circuit 1 of this embodiment, the standby power can be reduced since the duty ratio of the PWM signal is reduced when the power receiving device 2 is not placed.

Third Embodiment

Figure 6:
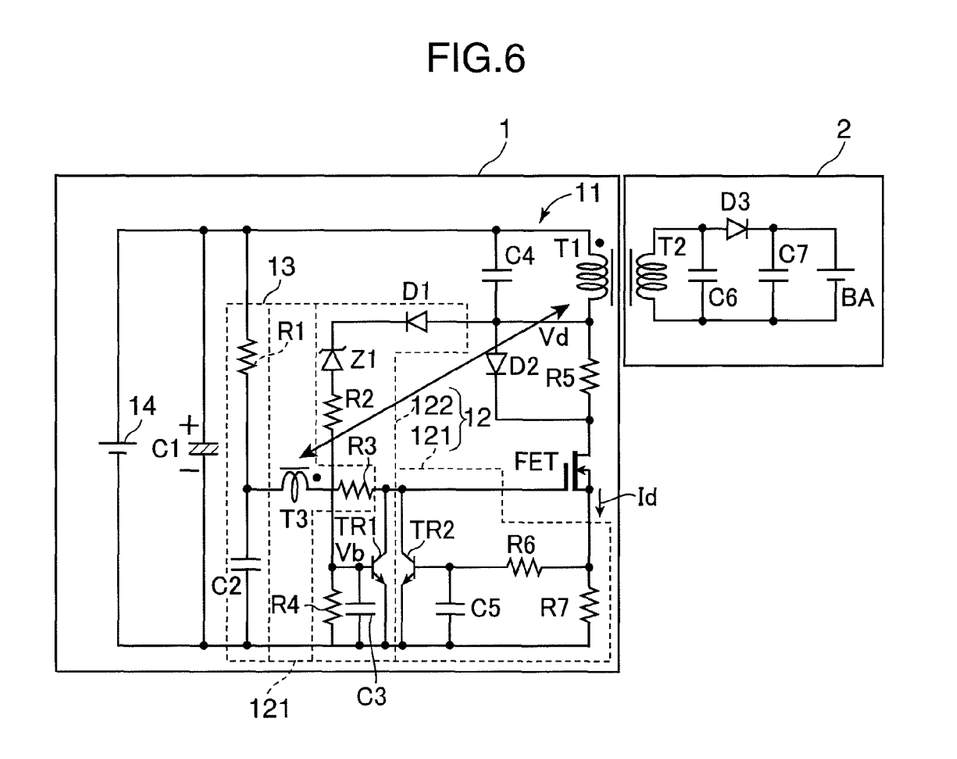
FIG. 6 is a circuit diagram of a charging system, to which a contactless power transmission circuit according to a third embodiment of the present invention is applied.

A contactless power transmission circuit 1 according to a third embodiment is characterizing by further providing a voltage regulator diode in the contactless power transmission circuit 1 of the first embodiment. FIG. 6 is a circuit diagram of a charging system, to which the contactless power transmission circuit 1 according to the third embodiment of the present invention is applied. In this embodiment, the same elements as those of the first and second embodiments are not described.

As shown in FIG. 6, a voltage regulator diode Z1 is provided between a resistor R2 and a diode D1. This voltage regulator diode Z1 is, for example, a Zener diode and an anode thereof is connected to the resistor R2 and a cathode thereof is connected to the diode D1.

The voltage regulator diode Z1 causes a current to flow from a resonant circuit 11 to a resistor R4 when a voltage of the cathode becomes larger than that of the anode by larger than a specified value while causing no current flow when this voltage difference is equal to or below the specified value. Thus, when the voltage of the cathode is larger than that of the anode by larger than the specified value in the voltage regulator diode Z1, an intermittent driving circuit 122 can be operated, whereby a possibility of an erroneous detection as to whether or not a power receiving device 2 is placed can be reduced. A value capable of preventing an erroneous detection from the magnitude of a voltage handled by the contactless power transmission circuit 1 can be preferably adopted as the specified value. For example, a value of about 6.2 V may be adopted.

Fourth Embodiment

Figure 7:
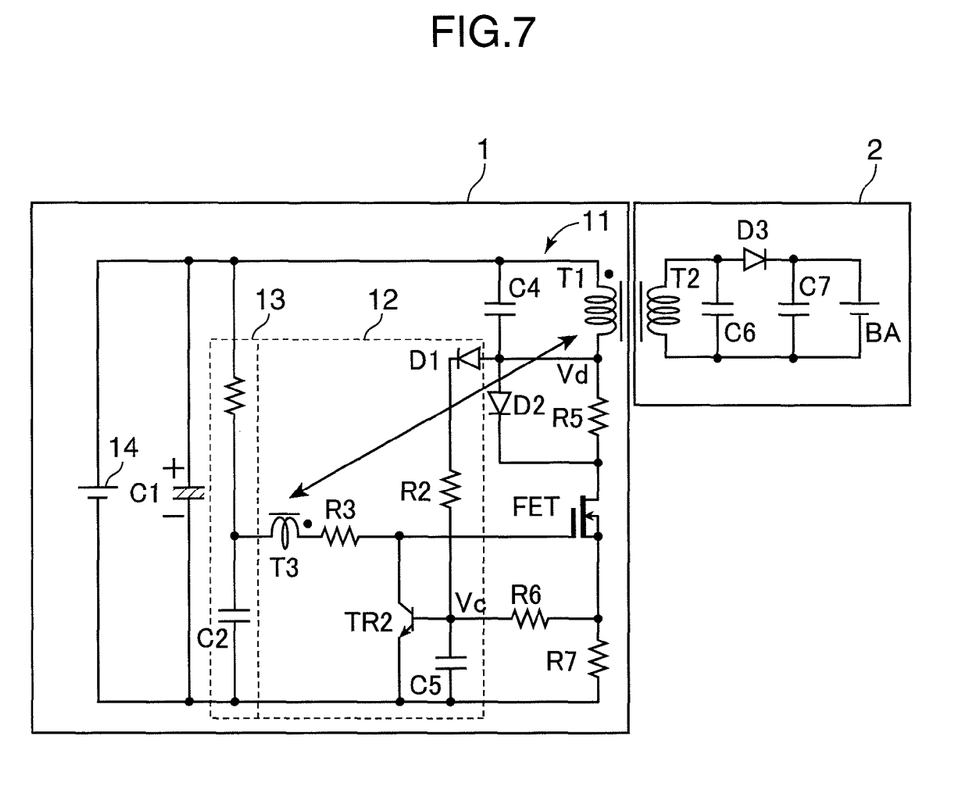
FIG. 7 is a circuit diagram of a charging system, to which a contactless power transmission circuit according to a fourth embodiment of the present invention is applied.

FIG. 7 is a circuit diagram of a charging system, to which a contactless power transmission circuit 1 according to a fourth embodiment of the present invention is applied. In this embodiment, the same elements as those of the first to third embodiments are not described. The contactless power transmission circuit 1 according to the fourth embodiment is characterized by uniting the self-oscillating circuit 121 and the intermittent driving circuit 122 in the contactless power transmission circuit 1 according to the first embodiment.

Specifically, the transistor TR2 is commonly used as the transistor TR1 shown in FIG. 1, the capacitor C5 is commonly used as the capacitor C3 and the resistor R4 is deleted.

As shown in FIG. 7, a driving circuit 12 includes a diode D1, resistors R2, R3, a feedback coil T3, a transistor TR2 and a capacitor C5. An anode of the diode D1 is connected to a resonant circuit 11 and a cathode thereof is connected to a base of the transistor TR2 via the resistor R2.

Thus, a voltage Vd becomes higher to increase a voltage Vc when a power receiving device 2 is not placed than when the power receiving device 2 is placed, and a bias voltage is applied to the base of the transistor TR2. Accordingly, the transistor TR2 can shorten a period from the turn-on of a switching element FET to the turn-off thereof when the power receiving device 2 is not placed. Therefore, when the power receiving device 2 is not placed, it is possible to shorten an ON-period of the switching element FET and reduce standby power.

Specifically, circuit constants of respective circuit elements constituting the contactless power transmission circuit 1 such as the resistors R2, R6, R7 and the capacitor C5 are determined such that the voltage Vc becomes, for example, 0.2 V when the power receiving device 2 is placed and the voltage Vc becomes, for example, 0.4 V when the power receiving device 2 is not placed.

Alternatively, the circuit constants of the respective circuit elements constituting the contactless power transmission circuit 1 may be determined such that the voltage Vc becomes equal to or higher than the threshold voltage (e.g. 0.6 V) of the transistor TR2 when the power receiving device 2 is not placed. In this way, the standby power can be reduced by intermittently oscillating the resonant circuit 11.

As described above, according to the contactless power transmission circuit 1 of this embodiment, one transistor and one capacitor are commonly used as the transistors TR1, TR2 and as the capacitors C3, C5. Thus, cost can be reduced and the circuit size can be reduced by reducing the number of parts and, simultaneously, the standby power can be reduced.

The technical features of the above contactless power transmission circuits are summarized as follows.

(1) A contactless power transmission circuit according to one aspect of the present invention is for transmitting power in a contactless state to a power receiving device placed on a placing portion and comprises a resonant circuit including a power transmission coil for transmitting power to the power receiving device and a resonant capacitor which resonates with the power transmission coil; a switching element for resonating the resonant circuit by being repeatedly turned on and off; and a driving circuit for detecting whether or not the power receiving device is placed on the placing portion based on a voltage of the power transmission coil and driving the switching element such that an ON-period of the switching element is shorter when the power receiving device is detected not to be placed than when the power receiving device is placed.

According to this construction, the power transmission coil resonates with the resonant capacitor as the switching element is turned on and off and transmits power to the power receiving device in a contactless manner. The driving circuit detects whether or not the power receiving device is placed based on the voltage of the power transmission coil. The driving circuit drives the switching element such that the ON-period of the switching element is shorter when the power receiving device is detected not to be placed than when the power receiving device is placed.

Thus, a current flowing into the power transmission coil decreases, an input current from a power supply decreases and standby power as power consumption when the power receiving device is not placed can be reduced. Further, since a detection as to whether or not the power receiving device is placed is made based on the voltage of the power transmission coil, this detection can be made by a simple circuit construction without providing a separate coil. Since the voltage of the power transmission coil notably differs between when the power receiving device is placed and when it is not placed, the detection as to whether or not the power receiving device is placed can be accurately made.

(2) Preferably, the driving circuit includes a self-oscillating circuit for repeatedly turning the switching element on and off based on the voltage of the power transmission coil and causing the self-oscillation of the resonant circuit, and an intermittent driving circuit for intermittently driving the self-oscillating circuit when the power receiving device is detected not to be placed.

According to this construction, the self-oscillating circuit is intermittently driven when the power receiving device is not placed. Thus, the switching element is kept off for a period during which the self-oscillating circuit is not driven, whereby the standby power can be reduced.

(3) Preferably, the driving circuit causes the separately-excited oscillation of the resonant circuit by outputting a PWM signal to the switching element and sets a lower duty ratio of the PWM signal when the power receiving device is detected not to be placed than when the power receiving device is placed.

According to this construction, when the power receiving device is not placed, the standby power can be reduced since the lower duty ratio of the PWM signal is set.

(4) Preferably, the intermittent driving circuit includes a first transistor connected to a control terminal of the switching element for turning the switching element off; a voltage dividing resistor for dividing a voltage of the resonant circuit and outputting the divided voltage to a control terminal of the first transistor; a diode connected between the resonant circuit and the voltage dividing resistor; and a first capacitor connected to the control terminal of the first transistor and charged with the voltage divided by the voltage driving resistor.

According to this construction, since the intermittent driving circuit is constructed by a simple circuit including the first transistor, the voltage dividing resistor, the diode and the first capacitor, the standby power can be reduced while the circuit size is hardly increased.

(5) Preferably, the intermittent driving circuit includes a voltage regulator diode connected between the diode and the voltage dividing resistor.

According to this construction, since the voltage regulator diode prohibits a current flow into the first transistor when the voltage of the power transmission coil is low, the operation of the intermittent driving circuit can be prevented when the power receiving device is placed.

(6) It is preferable that the self-oscillating circuit includes a second transistor for turning the switching element off and a second capacitor connected to a control terminal of the second transistor; that the second transistor is commonly used as the first transistor; and the second capacitor is commonly used as the first capacitor.

According to this construction, since one transistor is commonly used as the first and second transistor and one capacitor is commonly used as the first and second capacitors, cost can be reduced and the circuit size can be reduced by reducing the number of parts and, simultaneously, the standby power can be reduced.

This application is based on Japanese Patent Application Serial No. 2009-002823 filed in Japan Patent Office on Jan. 8, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A contactless power transmission circuit for transmitting power in a contactless state to a power receiving device placed on a placing portion, comprising:
a resonant circuit including a power transmission coil for transmitting power to the power receiving device and a resonant capacitor which resonates with the power transmission coil;
a switching element for resonating the resonant circuit by being repeatedly turned on and off; and
a driving circuit for detecting whether or not the power receiving device is placed on the placing portion using a property that a voltage of the power transmission coil is lower when the power receiving device is placed on the placing portion than when the power receiving device is not placed on the placing portion, and driving the switching element such that an ON-period of the switching element is shorter when the power receiving device is detected not to be placed on the placing portion than when the power receiving device is placed on the placing portion,
wherein the driving circuit includes
a self-oscillating circuit for repeatedly turning the switching element on and off based on the voltage of the power transmission coil to cause a self-oscillation of the resonant circuit, and
an intermittent driving circuit for intermittently driving the self-oscillating circuit when the power receiving device is detected not to be placed on the placing portion, and
wherein the self-oscillating circuit causes the self-oscillation of the resonant circuit for a period during which the intermittent driving circuit keeps the switching element on, and does not cause the self-oscillation of the resonant circuit for a period during which the intermittent driving circuit keeps the switching element off.

2. A contactless power transmission circuit for transmitting power in a contactless state to a power receiving device placed on a placing portion, comprising:
a resonant circuit including a power transmission coil for transmitting power to the power receiving device and a resonant capacitor which resonates with the power transmission coil;
a switching element for resonating the resonant circuit by being repeatedly turned on and off; and
a driving circuit for detecting whether or not the power receiving device is placed on the placing portion using a property that a voltage of the power transmission coil is lower when the power receiving device is placed on the placing portion than when the power receiving device is not placed on the placing portion, and driving the switching element such that an ON-period of the switching element is shorter when the power receiving device is detected not to be placed on the placing portion than when the power receiving device is placed on the placing portion,
wherein the driving circuit causes a separately-excited oscillation of the resonant circuit by outputting a PWM signal to the switching element and sets a lower duty ratio of the PWM signal when the power receiving device is detected not to be placed on the placing portion than when the power receiving device is placed on the placing portion, and
wherein the duty ratio of the PWM signal is a predetermined value capable of allowing detection of whether or not the power receiving device is placed on the placing portion and maximally increasing an OFF-period of the switching element when the power receiving device is not placed on the placing portion.

3. A contactless power transmission circuit according to claim 1,
wherein the intermittent driving circuit includes:
a first transistor connected to a control terminal of the switching element for turning the switching element off;
a voltage dividing resistor for dividing a voltage of the resonant circuit and outputting the divided voltage to a control terminal of the first transistor;
a diode connected between the resonant circuit and the voltage dividing resistor; and
a first capacitor connected to the control terminal of the first transistor and charged with the voltage divided by the voltage dividing resistor.

4. A contactless power transmission circuit according to claim 3,
wherein the intermittent driving circuit includes a voltage regulator diode connected between the diode and the voltage dividing resistor.

5. A contactless power transmission circuit according to claim 3, wherein:

the self-oscillating circuit includes a second transistor for turning the switching element off and a second capacitor connected to a control terminal of the second transistor;
the second transistor is commonly used as the first transistor; and
the second capacitor is commonly used as the first capacitor.

* * * * *